UNITED STATES PATENT OFFICE.

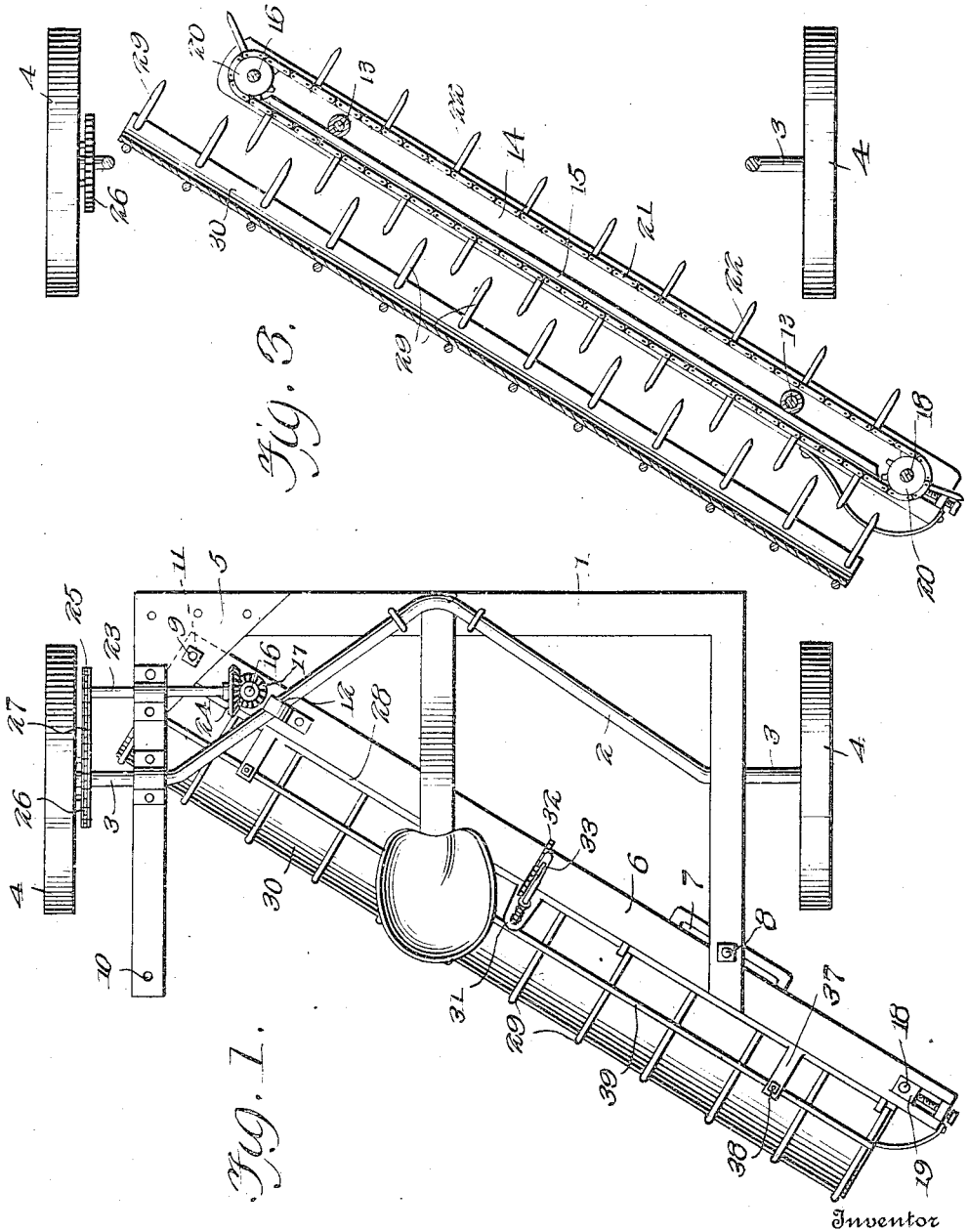

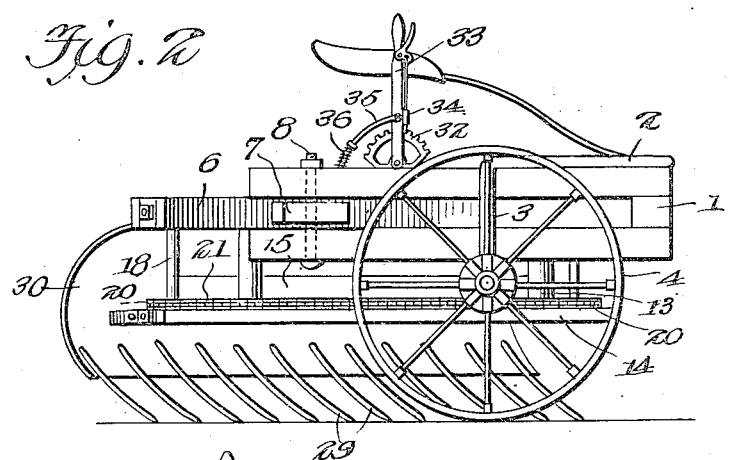
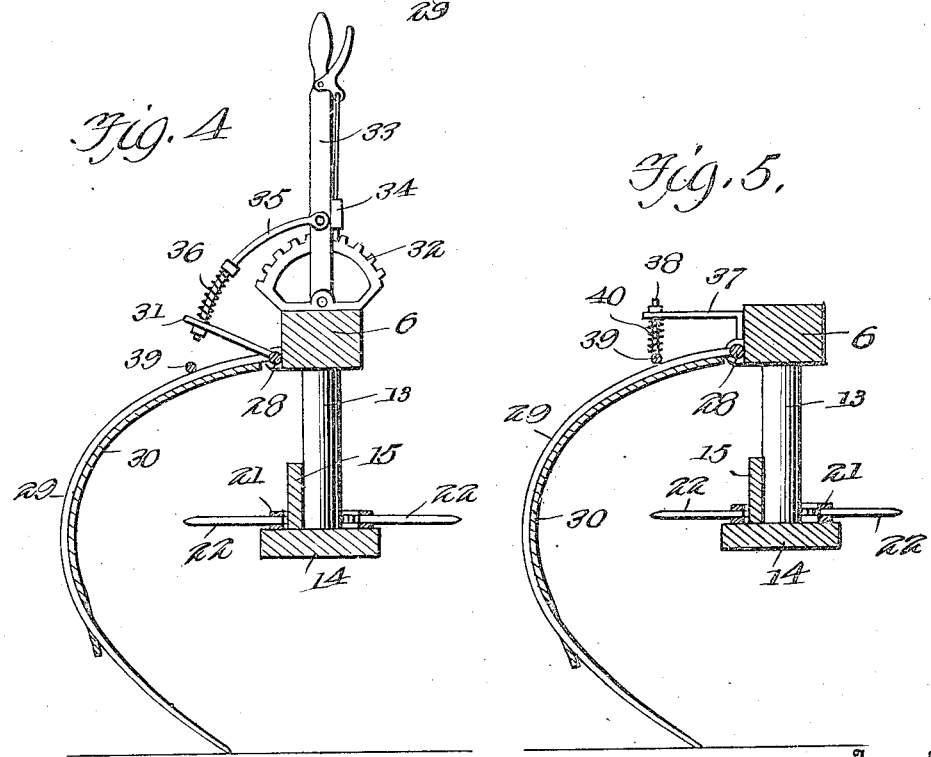

JOHN M. OBERHOLTZER, OF WOOSTER, OHIO.

HAY-RAKE.

1,252,156.   Specification of Letters Patent.   Patented Jan. 1, 1918.

Application filed May 19, 1916. Serial No. 98,591.

*To all whom it may concern:*

Be it known that I, JOHN M. OBERHOLTZER, a citizen of the United States, residing at Wooster, in the county of Wayne and State of Ohio, have invented new and useful Improvements in Hay-Rakes, of which the following is a specification.

This invention relates to hay rakes and it consists in the novel features hereinafter described and claimed.

An object of the invention is to provide a wheel mounted hay rake adapted to be drawn by draft animals, the same comprising a frame with an axle mounted thereon in a manner to brace the structure of the frame. A beam is adjustably positioned upon the frame and may be disposed at a right angle to the line of draft or at an acute angle with relation to the same, means being provided for securing the beam at the adjusted position. Means are provided upon the frame for operating a conveyer which is suspended below the beam from one of the supporting wheels of the rake when the beam is at an acute angle with relation to the line of draft. Suitable tines and a shield are carried by the said beam and means are provided for raising and lowering the said tines and shield.

In the accompanying drawing:—

Figure 1 is a top plan view of the rake.

Fig. 2 is a side elevation of the same.

Fig. 3 is a horizontal sectional view of the same.

Fig. 4 is a vertical sectional view through the intermediate portion thereof.

Fig. 5 is a similar view through an end portion thereof.

The rake comprises a frame 1 which is preferably formed from angle iron. Any suitable draft hitch may be applied to the forward portion of the said frame. The frame 1 is approximately U-shaped in top plan. An axle 2 passes transversely through the side portions of the frame 1 and the said axle is provided at its ends with crank portions 3 upon which supporting wheels 4 are journaled. The intermediate portion of the axle 2 is connected with the intermediate portion of the frame 1 whereby the said axle braces the frame structure. The frame 1 is provided at one of its forward corners with a plate 5. A beam 6 is provided at its forward edge with a guide 7 which receives a bolt 8 that is located at the right hand side of the frame 1 and at the rear end thereof. The beam 6 carries at one end a bolt 9 which may be inserted through an opening 10 provided at the rear end of the left hand side of the frame 1 or through an opening 11 provided in the plate 5. A clip 12 is mounted upon the upper side of the beam 6 and is adapted to receive a portion of the intermediate part of the axle 2 when the said beam is disposed at an acute angle with relation to the line of draft of the rake.

Studs 13 depend from the beam 6 and carry at their lower ends a guide bar 14. The said guide bar 14 is provided in the vicinity of its rear edge with an upstanding flange 15. A shaft 16 is journaled at one end of the guide bar 14 and passes vertically through the beam 6. A beveled pinion 17 is carried at the upper end of the shaft 16 and is located above the top surface of the beam 6. A shaft 18 is journaled in the other end of the bar 14 and the beam 6. The said shaft 18 is mounted in blocks 19 which are adjustably mounted in the guide bar and beam, there being provided suitable means for effecting the adjustment of the said blocks. Sprocket wheels 20 are carried by the shafts 16 and 18 and are located above the upper surface of the guide bar 14. A sprocket chain 21 is trained around the sprocket wheel 20 and some of the links of the said chain are provided with outstanding teeth or fingers 22. By adjusting the blocks 19 and the shaft 18 the sprocket chain 21 may be maintained at a desired degree of tension.

A shaft 23 is journaled upon the frame 1 and is provided at one end with a beveled pinion 24 which is adapted to mesh with the pinion 17 when the beam 6 is disposed at an acute angle with relation to the line of draft of the rake. A sprocket wheel 25 is carried at the outer end of the shaft 23. A sprocket wheel 26 is fixed with relation to the adjacent supporting wheel 4 and a sprocket chain 27 is trained around the sprocket wheels 25 and 26. Therefore when the said supporting wheel rotates rotary movement is transmitted through the chain 27 to the stud shaft 23. Inasmuch as the pinion 24 meshes with the pinion 17 the shaft 16 is rotated and the sprocket chain 21 is moved around the sprocket wheels 20.

A shaft 28 is rotatably mounted under the beam 6 and curved tines 29 are fixed at intervals along the said shaft 28. A shield 30, preferably of sheet metal, is applied to the upper portions of the tines 29 and closes the spaces between the same. A plate 31 is fixed to the intermediate portion of the shaft 28 and lies above the shield 30. The tines 29 are of resilient material hence they may flex or move with relation to each other and with relation to the shield and pass over obstructions.

A dentate segment 32 is fixed to the intermediate portion of the beam 6 and a lever 33 is fulcrumed at the side of the said segment. The lever 33 carries a spring pressed pawl 34 which is adapted to engage the teeth of the segment 32 whereby the said lever is held at an adjusted position with relation to the said segment. A bolt 35 is pivoted to the lower end of the lever 33 and passes through the plate 31. A spring 36 is interposed between the lower end of the lever 33 and the upper surface of the plate 31 and surrounds the said bolt 35. The spring 36 is under tension with a tendency to normally hold the head of the bolt 35 elevated toward the plate 31. Brackets 37 are carried at the end portions of the beam 6 and slidably receive bolts 38. The bolts 38 are mounted upon a rod 39 which lies transversely across the upper portions of the tines 29. Springs 40 are interposed between the rod 39 and the lower sides of the brackets 37 and are under tension with a tendency to force the rod 39 away from the bracket. Inasmuch as the said rod 39 bears against the upper portions of the tines 29 the springs 40 assist the spring 36 in holding the tines down toward the ground.

From the foregoing description taken in conjunction with the accompanying drawing it is apparent that when the beam 6 is disposed at an acute angle with relation to the line of draft and the tines 29 are in their lowered positions the said tines will gather the hay and the chain 27 will move the hay along the shield 30 to the rear end thereof at which point it is ejected and left in a row as the rake is moved over a field.

When the rake is being moved from one field to another or along a road the bolt 8 is removed from the opening 11 in the plate 5 and inserted in the opening 10 at the side of the frame 1 whereby the beam is held at a right angle with relation to the line of draft of the rake. Also the upper end of the lever 33 is swung rearwardly whereby the connecting bolt 37 swings the tines 29 up under the guide bar 14 and thus the said tines may readily pass over obstructions while the rake is being moved as indicated.

Having described the invention what is claimed is:—

A rake comprising a wheel mounted frame, a beam attached to the frame, a shaft journaled upon the beam, resilient tines fixed to the shaft, a shield carried by the tines and normally movable with the same and having openings through which the lower portions of the tines pass, the edges of the openings completely surrounding the tines, a rod bearing against the upper portions of all of the tines, and resilient means carried by the beam and bearing against the rod to hold the same in contact with the tines, and means for rocking the shaft.

In testimony whereof I affix my signature.

JOHN M. OBERHOLTZER.

Copies of this patent may be obtained for five cents each, by addressing the "Commissioner of Patents, Washington, D. C."